Patented Apr. 17, 1928.

1,666,694

UNITED STATES PATENT OFFICE.

WILHELM GAUS AND WILHELM WILD, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY.

PRODUCING MIXTURES OF NITROGEN AND HYDROGEN.

No Drawing. Original application filed November 3, 1923, Serial No. 672,643, and in Germany November 14, 1922. Divided and this application filed February 5, 1925. Serial No. 7,165.

This application includes subject matter which has been transferred from our co-pending application for patent, Serial No. 672,643, filed November 3, 1923, with the express intention of applying for this divisional application and has for its object an improved method for producing a mixture of nitrogen and hydrogen suitable for the catalytic manufacture of ammonia.

Such mixtures can be produced by mixing water gas and producer gas in suitable proportions so as to make nitrogen one third, by volume, of the sum of hydrogen and carbon monoxid, and replacing carbon monoxid by hydrogen by decomposing it with steam according to the equation $CO + H_2O = CO_2 + H_2$ or otherwise and removing all the carbon dioxid from the gas mixture.

The present invention has for its object not only to make water gas and producer gas in a single generator but to avoid the heating periods necessary with the ordinary water gas producers.

We have found that the aforesaid process can be modified with advantage into a continuous one, by introducing oxygen and air or air enriched with oxygen simultaneously with steam into a generator containing incandescent fuel. With the percentage of oxygen properly chosen and the steam, which is blown in at the same time, suitably controlled, the producer can be operated continuously without intercalating any heating periods and without any preheating of steam or air and oxygen, or both, or with only a slight preheating thereof. At the same time, the nitrogen contents in the mixed gas leaving the generator can be kept at the degree required for the production of the gas mixture for the ammonia process, that is one third, by volume, of the volume of hydrogen and carbon monoxid.

Such gas mixture is subsequently treated in any known or suitable manner with a view to decompose the carbon monoxid and to substitute hydrogen therefor, which for example may be done by passing the gas with steam over a contact mass containing iron oxid, or by passing it over heated calcium hydroxid, or other methods.

The oxygen or oxygenated air may be produced either by electrolysis or by liquefaction or rectification of air.

For example, a proper proportion is to blow in, for each cubic metre of nitrogen about 1 cubic metre of oxygen and 1.2 cubic metres of steam, or about 1.25 cubic metres of air, three quarters of a cubic metre of oxygen and 1.2 cubic metres of steam. The proportions necessary to secure a continuous operation of the producer and at the same time a gas mixture of the composition desired is, however, subject to variation and dependent on a number of circumstances such as amount of heat which is lost in the special producer employed, the temperature of the gases entering and leaving the producer, the rate of carbon dioxid formed and of steam leaving the producer unaltered, and of fuel consumed in the unit of time, the kind of fuel, its contents of moisture and slag and so on. The proper proportions of gases must ordinarily be ascertained empirically in each case and for this purpose and for accommodating the proportions to changes occurring in the course of the operation, one proceeds preferably in the following manner.

Oxygen is introduced into the producer either pure or as air enriched in oxygen for example by the Linde process and containing more than the required precentage of oxygen, and at the same time in mixture therewith or separately, air less enriched in oxygen, or ordinary air or nitrogen or air containing less than the regular percentage of oxygen as it may also be produced by the Linde process is introduced and also steam, and the proportions are so regulated that the gases leaving the producer contain hydrogen and carbon monoxid together in a volume three times that of the nitrogen, such manner of proceeding being far more advantageous than to produce a mixture of nitrogen and oxygen having just the composition required directly in the Linde system by suitably varying its operation which is connected with some difficulty. The use of air enriched in nitrogen or nitrogen alone derived from the Linde process has some advantages over air with regard to the ultimate use of the hydrogen nitrogen mixture for the ammonia synthesis in view of the low contents of argon which is found in the gases of the Linde process.

We claim:

1. In the catalytic synthesis of ammonia from nitrogen and hydrogen the preliminary steps of operating a producer, containing incandescent fuel with steam and with two kinds of oxygenated air differing in percentage of oxygen one containing less oxygen and the other containing more oxygen than atmospheric air and both derived from rectification of liquid air while controlling their proportions so as to give rise to a gas mixture containing one volume of nitrogen for each three volumes of the sum of hydrogen and carbon monoxid and to enable the producer to be continuously operated without intercalating heating periods, then subjecting the gas mixture to a suitable treatment to substitute hydrogen for the carbon monoxid in the gas mixture and removing the carbon dioxid.

2. In a catalytic synthesis of ammonia from nitrogen and hydogen the preliminary steps of operating a producer containing incandescent fuel with steam and with two gases, one containing a preponderance of oxygen, and the other, a preponderance of nitrogen, while controlling their proportions so as to give rise to a gas mixture containing one volume of nitrogen for each three volumes of the sum of hydrogen and carbon monoxid and to enable the producer to be continuously operated without intercalating heating periods, then subjecting the gas mixture to a suitable treatment to substitute hydrogen for the carbon monoxid in the gas mixture and removing the carbon dioxid.

In testimony whereof we have hereunto set our hands.

WILHELM GAUS.
WILHELM WILD.